United States Patent [19]

Kobatake

[11] Patent Number: 5,059,816
[45] Date of Patent: Oct. 22, 1991

[54] HIGH SPEED BOOSTER CIRCUIT

[75] Inventor: Hiroyuki Kobatake, Tokyo, Japan

[73] Assignee: NEC Corporation, Tokyo, Japan

[21] Appl. No.: 539,594

[22] Filed: Jun. 18, 1990

[30] Foreign Application Priority Data

Jun. 20, 1989 [JP] Japan .................... 1-158586

[51] Int. Cl.$^5$ ............... H03K 17/56; H03K 19/01
[52] U.S. Cl. .................... 307/246; 307/578;
307/482; 307/264; 363/60
[58] Field of Search ........... 307/110, 246, 296.2,
307/578, 482, 497, 264, 110; 364/189.09,
189.11, 226; 363/60

[56] References Cited

U.S. PATENT DOCUMENTS

| | | | |
|---|---|---|---|
| 4,346,310 | 8/1982 | Carter | 363/60 |
| 4,574,203 | 3/1986 | Baba | 307/578 |
| 4,612,462 | 9/1986 | Asano et al. | 307/264 |
| 4,649,289 | 3/1987 | Nakano | 307/246 |
| 4,725,746 | 2/1988 | Segawa et al. | 307/578 |

Primary Examiner—Stanley D. Miller
Assistant Examiner—Richard Roseen
Attorney, Agent, or Firm—Whitham & Marhoefer

[57] ABSTRACT

A booster circuit comprises first to third MOS-FETs, and a capacitance element. In the first MOS-FET, a gate is connected to a first signal terminal, a drain is connected to an output terminal, and a source is connected to a first power supply. In the second MOS-FET, a gate is connected to a predetermined point, a drain is connected to a signal terminal, to which a first signal being an inverted signal of a signal applied to the first signal terminal is applied, and a source is connected to the predetermined point. In the third MOS-FET, a gate is connected to a second power supply, a drain is connected to a second signal terminal, and a source is connected to the predetermined point. The capacitance element is connected at one terminal to a signal terminal, to which a second signal being an inverted signal of a signal applied to the second signal terminal is applied, and at the other terminal to the output terminal. In operation, a predetermined voltage is obtained with a high speed at the output terminal.

5 Claims, 3 Drawing Sheets

HIGH SPEED BOOSTER CIRCUIT

FIELD OF THE INVENTION

This invention relates to a booster circuit, and more particularly to, a booster circuit operating with a high speed to provide a high voltage.

BACKGROUND OF THE INVENTION

One type of a conventional booster circuit is shown in FIG. 1, and comprises first and second N channel MOS-FETs (called "$N_{11}$" and "$N_{12}$" hereinafter), an inverter $IN_{11}$, and a capacitance element C. The MOS-FET $N_1$ has a drain connected to an output terminal OUT, a gate connected to a first signal terminal $T_{11}$, and a source connected to a first power supply voltage of a ground potential GND. The MOS-FET $N_2$ has a gate connected through the inverter $IN_{11}$ to the first signal terminal $T_{11}$, a drain connected to a second power supply terminal of a voltage Vcc and a source connected to the output terminal OUT. The capacitance element C is connected at one terminal to a second signal terminal $T_{12}$ and at the other terminal to the output terminal OUT.

In operation, when a first signal of "high" is applied to the first signal terminal $T_{11}$, the $N_{11}$ is "on" (conductive), while the $N_{12}$ is "off"(non-conductive), so that an output signal $V_{OUT}$ of "low" is obtained at the output terminal OUT, as shown in FIG. 2. Next, when the first signal becomes "low", the $N_{11}$ is turned off, while the $N_{12}$ is turned on, so that the output signal $V_{OUT}$ of "Vcc-$V_{TN}$" is obtained at the output terminal, as shown in FIG. 2. The voltage "$V_{TN}$" is a threshold voltage of an N channel MOS-FET. When the second signal becomes "high", the output signal $V_{OUT}$ is increased at the output terminal OUT to "2Vcc-$V_{TN}$" due to the presence of the capacitance element C.

In the conventional booster circuit, the $N_{12}$ and the capacitance element C may be replaced by third to fifth N channel MOS-FETs (called "$N_{13}$", "$N_{14}$" and "$N_{15}$" hereinafter) and first and second capacitance elements $C_{11}$ and $C_{12}$, as shown in FIG. 3. The MOS-FET $N_{13}$ has a gate connected to the inverter $IN_{11}$ which is connected to the first signal terminal $T_{11}$, a drain connected to the second power supply terminal of the voltage Vcc, and a source connected to a first connecting point 11 for connecting a drain and a gate of the $N_{14}$ and the first capacitance element $C_{11}$. The source of $N_{14}$ is connected to a second connecting point 12 for connecting a drain and a gate of the $N_{15}$ and the second capacitance element $C_{12}$, and the source of $N_{15}$ is connected to the output terminal OUT. In addition, the first capacitance element $C_{11}$ is connected at one terminal to a first clock signal terminal $\phi$, and the second capacitance element $C_{12}$ is connected at one terminal to a second clock signal terminal $\phi$. Consequently, the third to fifth N channel MOS-FETs ($N_{13}$ to $N_{15}$), and the first and second capacitance elements $C_{11}$ and $C_{12}$ thus connected provide a charge pump circuit. A clock signal applied to the second clock signal terminal $\phi$ is an inverted signal of a clock signal applied to the first clock signal terminal $\phi$.

In operation, a voltage of the first connecting point 11 is charged up to "Vcc-$V_{TN}$" by the $N_{13}$, and this voltage is pushed up to "2Vcc-$V_{TN}$" by the first capacitance element $C_{11}$. The pushed-up voltage of "2Vcc-$V_{TN}$" is charged up to "2Vcc-2$V_{TN}$" at the second connecting point 12 by the $N_{14}$. This charge-up voltage of "2Vcc-2$V_{TN}$" is further pushed up to "3Vcc-2$V_{TN}$" by the second capacitance element $C_{12}$, and this voltage of "3Vcc-2$V_{TN}$" is charged up to "3Vcc-3$V_{TN}$" at the output terminal OUT by the $N_{15}$.

In the second conventional booster circuit, the charge pump circuit includes a two-stage structure consisting of the $N_{14}$ and the first capacitance element $C_{11}$, and the $N_{15}$ and the second capacitance element $C_{12}$. As understood from the above, if the charge pump circuit includes an N-stage structure, where N is an integer, a voltage is increased to $(N+1) \cdot (Vcc-V_{TN})$.

However, the first type of the conventional booster circuit has a disadvantage in that the maximum voltage is limited to a voltage of "2Vcc-$V_{TN}$" at the output terminal OUT, because the charge-up oltage of the $N_{12}$ is limited to a voltage of "Vcc-$V_{TN}$", although a voltage of the output terminal is increased simultaneously, when the signal of the second signal terminal $T_{12}$ becomes "high".

On the other hand, the second type of the conventional booster circuit can boost the output terminal OUT up to a voltage twice or more as large as Vcc. However, this circuit has a disadvantage in that it takes a considerable time to obtain a predetermined voltage at the output teminal OUT, because the clock signals $\phi$ and $\phi$ has to be employed. For instance, where a period of the clock signals is 1 μsec, it takes 10 μsec equivalent to ten periods of the clock signals to provide the predetermined voltage at the output terminal OUT. Increasing the number of stages in the charge pump circuit to make an output voltage higher makes the time longer proportionally.

SUMMARY OF THE INVENTION

Accordingly, it is an object of this invention to provide a booster circuit operating with a high speed in providing a predetermined voltage.

It is a further object of this invention to provide a booster circuit in which a high output voltage is obtained.

According to this invention, a booster circuit, comprises a first field effect transistor having a gate connected to a first signal terminal supplied with a first signal and a source-drain path connected between an output terminal and a first power supply, a second field effect trasistor having a gate connected to a first node and a source-drain path connected between said output terminal and a second node, the second node being supplied with an inverted signal of the first signal, a third field effect transistor having a gate connected to a second power supply and a source-drain path connected between a second signal terminal and the first node, the second signal terminal being supplied with a second signal that is different in phase from the first sigal, and a capacitance element connected between a third node and the output terminal, the third node being supplied with a signal relative to the second signal.

BRIEF DESCRIPTION OF THE DRAWINGS

This invention will be described in more detail in conjunction with appended drawings, wherein.

DESCRIPTION OF THE PREFERRED EMBODIMENTS

Figure 1:
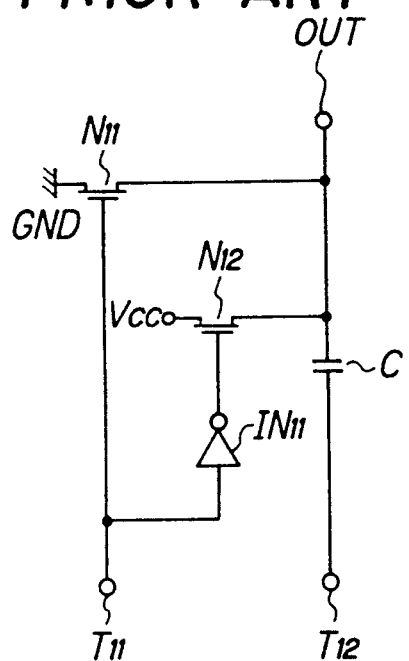
FIG. 1 is a circuitry diagram showing the first type of the conventional booster circuit.
Figure 2:
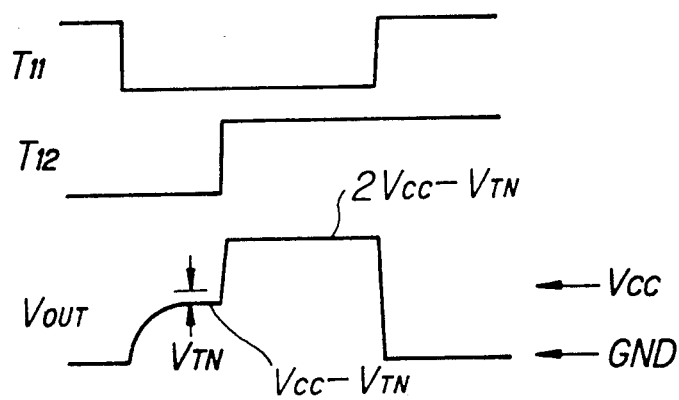
FIG. 2 is a timing chart showing operation in the first type of the conventional booster circuit.

A booster circuit in the first preferred embodiment according to the invention will be explained in FIG. 4, wherein it comprises first to third N channel MOS-FETs $N_1$, $N_2$ and $N_3$, first and second inverters $IN_1$ and $IN_2$, and a capacitance element C. In the booster circuit, the N1 is connected at a drain to an output terminal OUT, at a gate to a first signal terminal $T_1$, and at a source to a first power supply of a ground potential GND, the $N_2$ is connected at a drain through the first inverter $IN_1$ to the first signal terminal $T_1$ and at a source to the output terminal OUT, the $N_3$ is connected at a drain to a second signal terminal $T_2$, at a source to a gate of the $N_2$ to provide a connecting point 1, and at a gate to a second power supply of a voltage Vcc, and the capacitance element C is connected at one terminal through the second inverter $IN_2$ to the second signal terminal $T_2$, and at the other terminal to the output terminal OUT. The MOS-FET $N_2$ has a parasitic capacitance $C_{GD}$ between the drain and gate thereof and another parasitic capacitance $C_{GS}$ between the source and gate theroof. Each of the inverters $IN_1$ and $IN_2$ receives Vcc and GND as operating voltages and thus "high" and "low" outputs thereof are substantially equal to levels of Vcc and GND, respectively.

Operation of this booster circuit will be explained in conjunction with FIG. 5. When the signals at the first and second signal terminals $T_1$ and $T_2$ are "high", the $N_1$ is "on" (conductive), so that a voltage $V_{OUT}$ at the output terminal OUT is the ground potential. At this time, the connecting point 1 is charged up to a level of "Vcc$-V_{TN}$" by the $N_3$. $V_{TN}$ represents threshold voltages of the MOS-FETs $N_1$, $N_2$ and $N_3$. When the signal at the first signal terminal $T_1$ becomes "low", the $N_1$ is turned off and the inverter $IN_1$ provides an output of "high". Consequently, the voltage at the connecting point 1 is boosted up to the level of "2Vcc$-$VT" by the parasitic capacitance $C_{GD}$. The MOS-FET $N_3$ is reverse-biased to be in off state. Since the voltage at the point 1 is greater than a level of "Vcc$+V_{TN}$", the output terminal OUT is charged up to a level of "Vcc" independently of the threshold value "$V_{TN}$". The capacitor C is also charged up to Vcc.

Then, the signal at the second signal terminal $T_2$ is inverted to "low", so that the $N_3$ is turned on to discharge the connecting point 1 to GND. The $N_2$ is thereby turned off. On the other hand, the inverter $IN_2$ outputs "high" (Vcc), so that the output voltage $V_{OUT}$ is boosted from "Vcc" to "2Vcc" by the capacitance element C. A time period $t_{12}$, during which the signals at the first and second signal terminals $T_1$ and $T_2$ are in the low and high levels, respectively, is required to increase the output voltage from the ground potential GND to the second power supply voltage Vcc. This time period $t_{12}$ can be as short as 10 to 20 n sec, however. As understood from this explanation, the voltage $V_{OUT}$ is boosted to the level of "2Vcc" in a very short time period of 10 to 20 n sec after the low state of the signal applied to the first signal terminal $T_1$.

When the signal at the first signal terminal $T_1$ is returned to "high" level, the $N_1$ is turned on to change the output voltage $V_{OUT}$ to the ground potential. When the signal at the second signal terminal $T_2$ is thereafter changed to the high level, the connecting point 1 is charged again up to a level of "Vcc$-V_{TN}$" by the $N_3$. The inverter $IN_2$ produces the low output. In this state, the output voltage $V_{OUT}$ is lowered to a level less than the ground potential for the presence of the capacitance element C. The lowered voltage is represented by "$V_{US}$" in FIG. 5 and is defined as follows, because the $N_1$ is turned on for this period.

$$V_{US} = Vcc \times Z_1 / (Z_1 + Z_C),$$

where $Z_1$ is an impedance of the $N_1$, and Zc is that of the capacitance element C.

Figure 3:
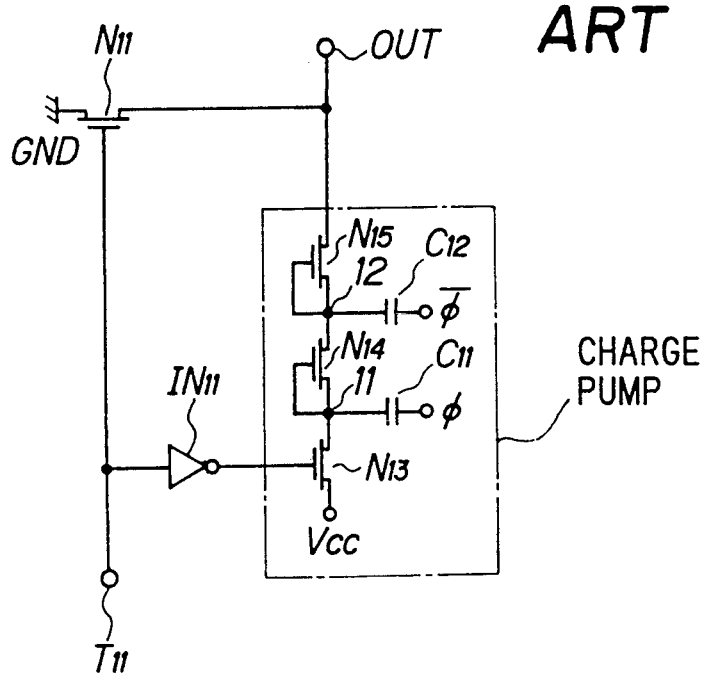
FIG. 3 is a circuitry diagram showing the second type of the conventional booster circuit.

By setting a relation between values of $Z_1$ and Zc to be "$Z_1 << Zc$" in the above equation, the lowered voltage $V_{US}$ can be suppressed as small as expected. Thus, the booster circuit of FIG. 1 can boost the output terminal OUT($V_{OUT}$) up to the level of 2Vcc at a high speed without employing clock signals ($\phi$) shown in FIG. 3.

Figure 4:
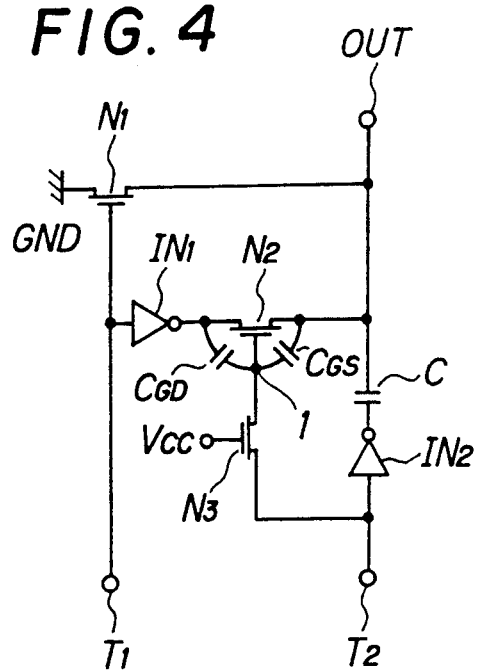
FIG. 4 is a circuitry diagram showing a booster circuit in a first preferred embodiment according to the invention.
Figure 6:
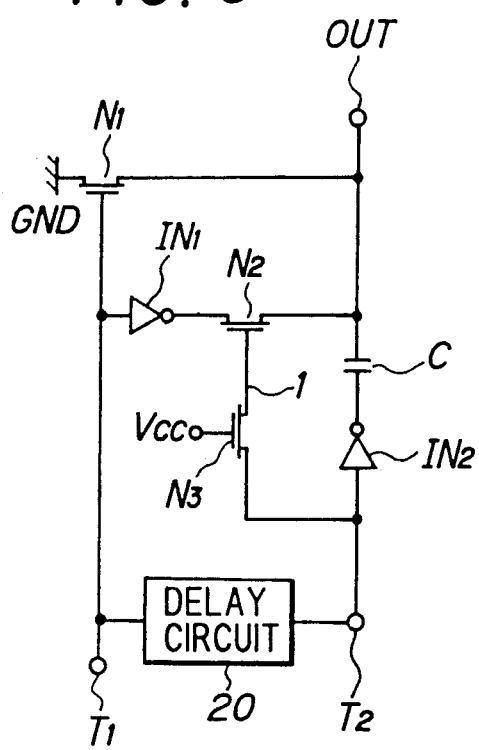
FIGS. 6 to 8 are circuitry diagrams showing booster circuits in second to fourth preferred embodiments according to the invention, respectively.

FIG. 6 shows a booster circuit in the second preferred embodiment, wherein like parts are indicated by like reference numerals and symbols as used in FIG. 4 to omit further discription thereof. In this embodiment, a delay circuit 20 is provided between the first and second signal terminals $T_1$ and $T_2$.

Figure 5:
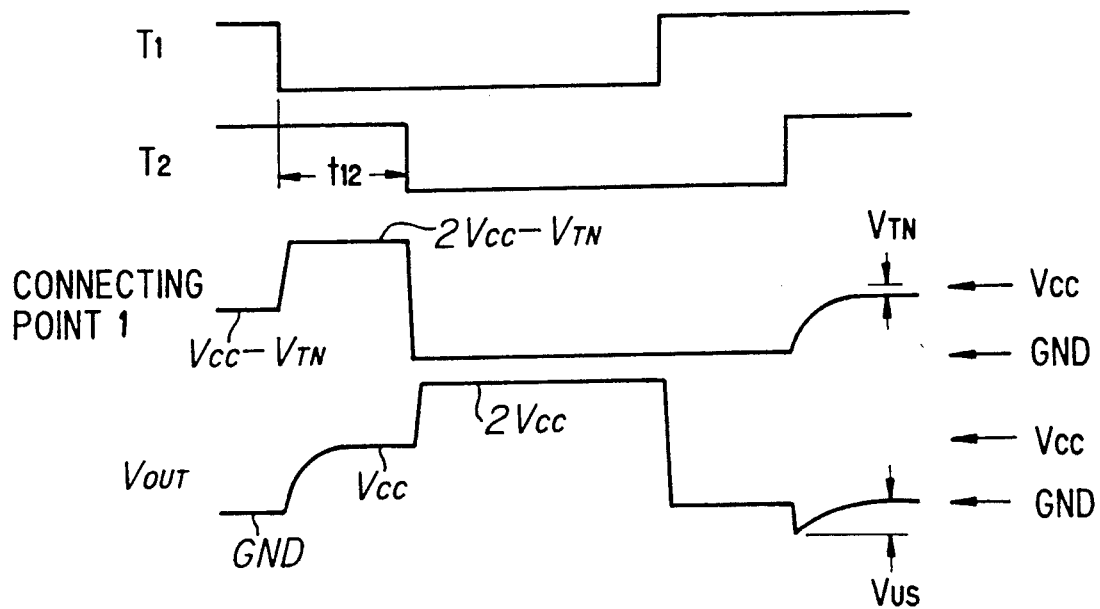
FIG. 5 is a timing chart showing operation in the first preferred embodiment.

If it is designed that the delay circuit 20 has a delay time equal to the time $t_{12}$ as shown in FIG. 5, the same operation as in the first preferred embodiment is carried out in the second preferred embodiment. Even more, it provides an additional advantage in that the second signal is not necessary to be applied to the second input terminal $T_2$.

Figure 7:
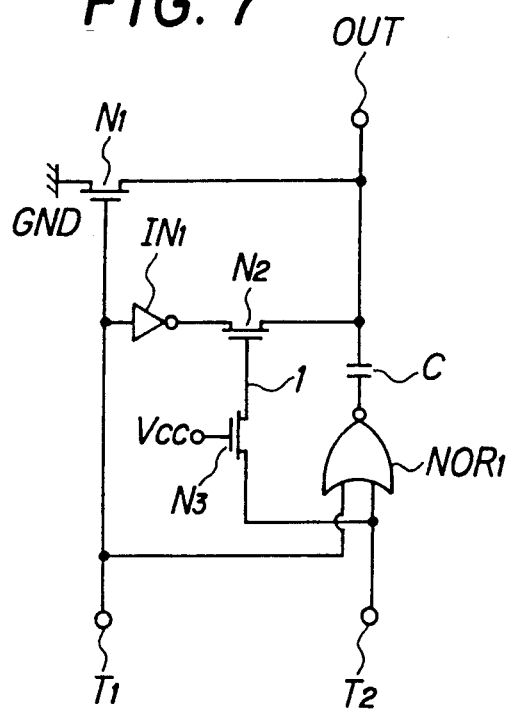

FIG. 7 shows a booster circuit in the third preferred embodiment, wherein like parts are indicated by like reference numerals and symbols as used in FIG. 4. A NOR circuit NOR 1 is provided in place of the second inverter $IN_2$ which is connected at a first input terminal to the first signal terminal $T_1$, at a second input terminal to the drain of the $N_3$ and the second signal terminal $T_2$, and at an output terminal to the capacitance element C.

The operation of this booster circuit is the same as that of the circuit of FIG. 4, until the voltage at the output terminal OUT is boosted up to 2Vcc. When the signal at the first signal terminal $T_1$ is changed to "high", the $N_1$ is turned on to discharge the output terminal OUT. Simultaneously, the output signal of the NOR 1 is changed from "high" (Vcc) to "low" (the ground potential) to discharge the capacitor C. Thus, the capacitor C is applied with the ground voltage at both ends thereof. Therefore, if it is assumed that a timing, at which the output signal of the NOR 1 is changed from "high" to "low", is $t_D$, it is avoided that the voltage is lowered to a level less than the ground potential due to the presence of the capacitance element C at the output terminal OUT by setting a current flowing from the output terminal OUT through the $N_1$ to the first power supply of the ground potential GND to be less than a value I as defined below.

$$I = Cc \times Vcc / t_D.$$

where Cc is a capacitance value of the capacitance element C. This is a particular advantage in the third preferred embodiment.

Figure 8:
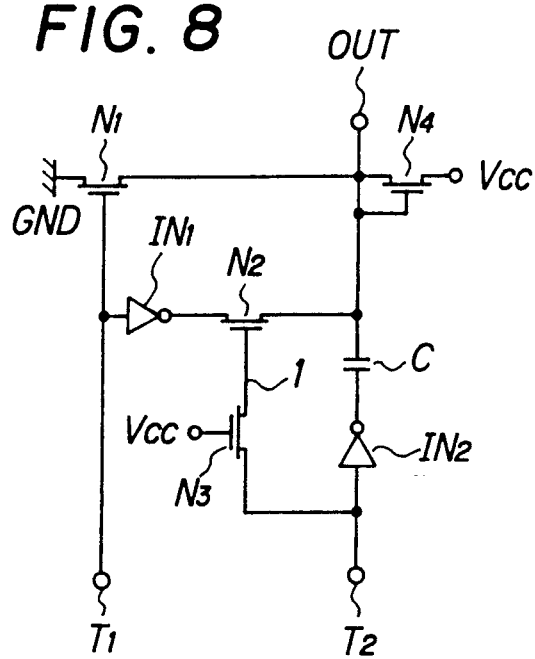

FIG. 8 shows a booster circuit in the fourth preferred embodiment, wherein like parts are indicated by like reference numerals and symbols as used in FIG. 4. In this embodiment, a fourth N channel MOS-FET $N_4$ is additionally provided to be connected at a drain and a gate to the output terminal OUT, and at a source to the second power supply of the voltage Vcc.

In operation, when the voltage at the output terminal OUT is increased to a level greater than "Vcc+$V_{TN}$", the $N_4$ is turned on to clamp the output voltage to be the level of "Vcc+$V_{TN}$". This is an advantage in the fourth preferred embodiment in that the output voltage is avoided to be too high, when a power supply voltage is high.

As a matter of course, two preferred embodiments may be combined to provide the same advantage among the second to fourth preferred embodiments. Further, the capacitance element may be replaced by a gate capacitance of a MOS-FET, a capacitance of a three layer structure including a polycrystalsilicon, oxidation film, and a polycrystalsilicon, etc.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A booster circuit, comprising:
   a first field effect transistor having a gate connected to a first signal terminal supplied with a first signal and a source-drain path connected between an output terminal and a first power supply;
   a second field effect transistor having a gate connected to a first node and a source-drain path connected between said output terminal and a second node;
   first means for supplying said second node with an inverted signal of said first signal;
   a third field effect transistor having a gate connected to a second power supply and a source-drain path connected between a second signal terminal and said first node, said second signal terminal being supplied with a second signal different in phase from said first signal;
   a capacitance element connected between said output terminal and a third node; and
   second means for supplying said third node with a third signal relative to said second signal.

2. A booster circuit, according to claim 1, further comprising:
   a delay circuit inserted between said first and second signal terminals, said delay circuit delaying said first signal to produce said second signal.

3. A booster circuit, according to claim 1, wherein:
   said second means comprises an inverter circuit for producing an inverted signal of said second signal as said third signal.

4. A booster circuit, according to claim 1, wherein:
   said second means comprises a NOR circuit having a first input terminal connected to said first signal terminal and a second input terminal connected to said second signal terminal.

5. A booster circuit, according to claim 1, further comprising:
   a fourth field effect transistor having a gate connected to said output terminal and a source-draing path connected between said second power supply and said output terminal.

* * * * *